United States Patent [19]

Tabe et al.

[11] 4,433,833
[45] Feb. 28, 1984

[54] APPARATUS FOR CONTROLLING THE SPRING CONSTANT OF A LAMINATED LEAF SPRING ASSEMBLY

[75] Inventors: Takayuki Tabe, Tokyo; Takeyoshi Shinbori, Yokosuka, both of Japan

[73] Assignee: NHK Spring Co., Ltd., Yokohama, Japan

[21] Appl. No.: 417,383

[22] Filed: Sep. 13, 1982

[30] Foreign Application Priority Data

Mar. 23, 1982 [JP] Japan .................................. 57-46057

[51] Int. Cl.³ ............................................ B60G 11/36
[52] U.S. Cl. ........................................ 267/18; 267/48
[58] Field of Search ....................... 267/18, 23, 24, 31, 267/28, 36 A, 48, 182, 47, 153, 52, 53

[56] References Cited

U.S. PATENT DOCUMENTS

| 1,278,772 | 9/1918 | Sinsou | 267/24 |
|---|---|---|---|
| 1,618,705 | 2/1927 | Hamilton | 267/48 |
| 1,672,513 | 6/1928 | Baird | 267/47 |
| 1,733,364 | 10/1929 | Beaumont et al. | 267/48 |
| 1,982,398 | 11/1934 | Pieper | 267/31 |
| 2,192,646 | 3/1940 | Lindeman | 267/48 |
| 3,237,957 | 3/1966 | Harbens | 267/31 |
| 4,022,449 | 5/1977 | Estorff | 267/48 |

FOREIGN PATENT DOCUMENTS

| 13350 | of 1928 | Australia | 267/48 |
|---|---|---|---|
| 15853 | 6/1930 | Australia | 267/48 |
| 38695 | 5/1931 | France | 267/48 |
| 36-5557 | 5/1961 | Japan . | |
| 55-120837 | 2/1979 | Japan . | |
| 5675337 | 11/1979 | Japan . | |
| 261023 | 3/1927 | United Kingdom | 267/48 |

Primary Examiner—Bruce H. Stoner, Jr.
Assistant Examiner—Robert J. Oberleitner
Attorney, Agent, or Firm—Frishauf, Holtz, Goodman and Woodward

[57] ABSTRACT

An apparatus for controlling the spring constant of a laminated leaf spring assembly includes a clamping mechanism mounted on the laminated leaf spring assembly for clamping the laminated leaf spring assembly in the direction of thickness thereof. The clamping mechanism includes a fixed spring-supporting member on which a helper spring unit of the assembly is attached to be separated a determined distance from a main spring unit of the assembly. A movable press member positioned to face the helper spring unit and press the main spring unit against the helper spring unit is also provided. The controlling apparatus further includes a piston arrangement for pressing the press member to urge the main spring unit against the helper spring unit.

7 Claims, 6 Drawing Figures

APPARATUS FOR CONTROLLING THE SPRING CONSTANT OF A LAMINATED LEAF SPRING ASSEMBLY

BACKGROUND OF THE INVENTION

The present invention relates to an apparatus for controlling the spring constant of a laminated leaf spring assembly including a main spring unit and a helper spring unit.

A laminated leaf spring assembly including a main spring unit and a helper spring unit has been widely used for suspending a body, for instance the body of a vehicle. The main spring unit and helper spring unit are each provided with at least one leaf spring. The main spring unit and helper spring unit are coupled together at their center by a center bolt. The relation between the main and helper spring units is determined by the load acting on the body of a vehicle to be supported, i.e., the load acting on the laminated leaf spring assembly. When the load is low, the ends of the helper spring unit are separated from the main spring unit. As the load is gradually increased, the main spring unit gradually flexes. Until the load P becomes $P_1$, for instance, as shown in FIG. 1, the deflection $\delta$ of the laminated leaf spring assembly is inversely proportional to the spring constant $K_1$ of the main spring unit and is given as (where $P < P_1$)

$$\delta = P/K_1$$

When the load P becomes $P_1$, the main spring unit comes into initial contact with the helper spring unit. As the load increases beyond $P_1$, the area of contact is gradually increased. When the load reaches $P_2$, the main spring unit is in complete contact with the helper spring unit. At this time, the elasticity of the helper spring acts upon the main spring unit, so that the spring constant of the laminated leaf spring assembly is $K_2$, that is, with the load $P_2$ the deflection $\delta_2$ is $\delta_2 = P_2/K_2$. As the load increases from $P_1$ to $P_2$, the area of contact between the main spring unit and helper spring unit is gradually increased, and at the same time the spring constant of the laminated leaf spring assembly is gradually increased in a linear fashion from $K_1$ to $K_2$. That is, while the load is being increased from $P_1$ to $P_2$, the laminated leaf spring assembly acts as a progressive spring.

In the conventional laminated leaf spring assembly of this kind, the spring characteristics are determined absolutely once the form of the main spring unit and helper spring unit is determined. Thus, the deflection of the laminated leaf spring assembly is determined by the value of the load acting on the body of a vehicle. Therefore, the attitude of the body of a vehicle is liable to be influenced by the value of the load. Also, the spring constant cannot be changed even if the state of the road is changed from good to bad or vice versa. For example, when the vehicle falls into a hole, an upward load acts upon the laminated leaf spring assembly through tires or the like. When the upward load is created in this way, the laminated leaf spring assembly usually deflects in the direction opposite to the direction of deflection. Therefore, the amplitude of vibrations of the laminated leaf spring assembly in the vertical directions is increased so that its durability is reduced.

SUMMARY OF THE INVENTION

It is therefore an object of the invention to provide an apparatus for controlling the spring constant of a laminated leaf spring assembly including a main spring unit and a helper spring unit, in which the spring constant of the laminated leaf spring is optimized by varying it in accordance with the road condition and the value of the load acting on a body to be supported.

To this end, according to the invention there is provided an apparatus for controlling the spring constant of the laminated leaf spring assembly, which comprises a clamping means mounted on the laminated leaf spring assembly for clamping the laminated leaf spring assembly in the direction of thickness thereof. The clamping means includes a fixed spring-supporting member on which the helper spring unit is attached so that it can be separated a predetermined distance from the main spring unit, and a movable press member positioned to face the helper spring unit and press the main spring unit against the helper spring unit. The apparatus further comprises means for controlling the movement of the press member to vary the distance between the main spring unit and the helper spring unit.

The above and further objects and novel features of the invention will more fully appear from the following detailed description when the same is read in connection with the accompanying drawings. It is to be expressly understood, however, that the drawing is for purpose of illustration only and is not intended as a definition of the limits of the invention.

DETAILED DESCRIPTION OF THE PREFERRED EMBODIMENT

Figure 2:
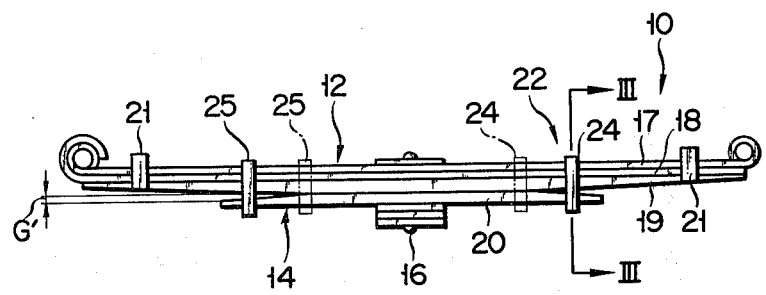
FIG. 2 is a front view of a laminated leaf spring unit incorporating a control apparatus according to one preferred embodiment of this invention.

Referring to FIG. 2, a laminated leaf spring assembly 10 includes a main spring unit 12 and a helper spring unit 14. The main spring unit 12 and helper spring unit 14 are coupled together at the center in their longitudinal direction by a bolt unit 16. In this embodiment, the main spring unit 12 includes three leaf springs 17, 18 and 19, and the helper spring unit 14 includes a leaf spring 20. The numbers of springs constituting the main and helper spring units in this embodiment are not limited, and they can be suitably varied. The three leaf springs of the main spring unit 12 are coupled together at their opposite ends by a pair of clips 21.

An apparatus 22 for controlling the spring constant of the laminated leaf spring assembly comprises a pair of clamping means 24 and 25. The clamping means 24 and 25 are respectively disposed at the end portions of the helper spring unit 14 and connected to the main spring unit 12 and helper spring unit 14. The clamping means 24 and 25 are of the same structure and serve to clamp the spring units 12 and 14 in the direction of their thickness and permit sliding movement of the spring unit 12 relative to the spring unit 14.

Figure 3:
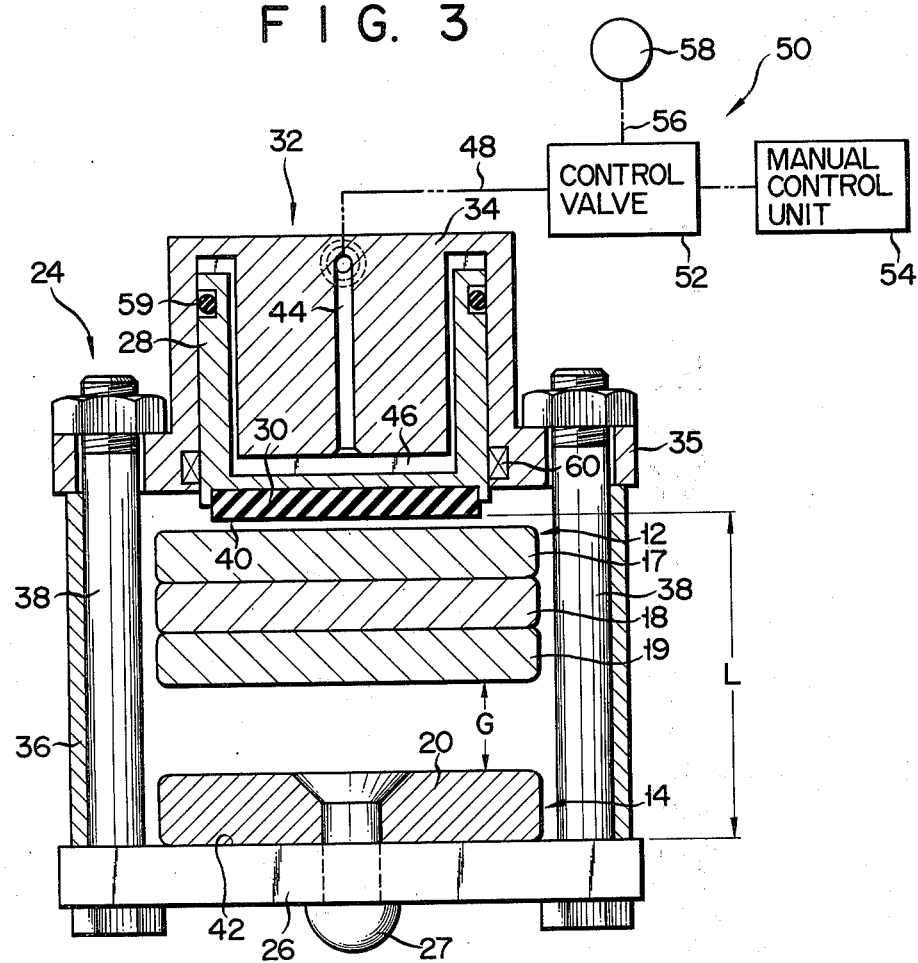
FIG. 3 is an enlarged longitudinal sectional view taken along line III—III of FIG. 2.

The construction of the clamping means 24 will be described below. Referring now to FIG. 3, the clamping means 24 comprises a spring-supporting member 26 and a press member 28. The leaf spring 20 of the helper spring unit 14 is fixed on the spring-supporting member 26 by rivets 27. The press member 28 presses against the upper surface of the leaf spring 17 of the main spring unit 12 through an intermediate member 30. The intermediate member 30 is made of, for instance, an elastic material such as hard rubber so as to permit sliding movement of the leaf spring 17 relative to the press member 28.

A pair of hydraulic cylinder means 32 are mounted on the clamping means 24 and 25, respectively. The hydraulic cylinder means 32 comprises a cylinder 34 having an outer flange 35 formed integrally at its open end. The outer flange 35 is fixed to the spring-supporting member 26 through a cylindrical spacer 36 by bolts 38. The press member 28 is disposed for vertical movement in the cylinder 34, and serves as a piston. A distance L between the lower surface 40 of the intermediate member 30 and the upper surface 42 of the spring-supporting member 26 is set to secure a determined gap G between the main spring unit 12 and the helper spring unit 14 when the piston 28 is moved to the uppermost position. A passage 44 is formed in the base wall of the cylinder 34. Compressed oil flows into or from a chamber 46 defined in the cylinder 34 through a duct 48.

The apparatus 22 for controlling the spring constant of the laminated leaf spring assembly 10 further comprises a hydraulic control means 50, as shown in FIG. 3. The hydraulic control means 50 includes a control valve 52 for controlling the pressure of the compressed oil to be supplied into the chamber 46 and a manual control unit 54 for issuing signals so as to operate the control valve 52. The control valve 52 is connected through a duct 50 to a fluid source 58 having a reservoir, a motor and a pump. Reference numerals 59 and 60 denote an O-ring and a duct seal, respectively.

Figure 1:
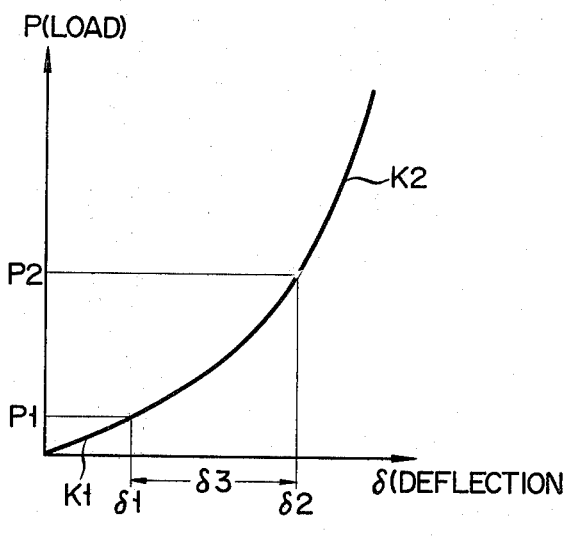
FIGS. 1, 4, 5 and 6 are graphs for explaining relationships between load and deflection, respectively.
Figure 4:
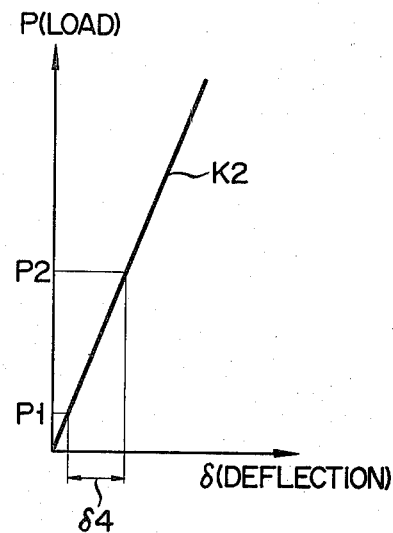

The operation of the control apparatus 22 having the above construction will now be described. The compressed oil in the chamber 46 is drained, and the press member or piston 28 is brought to the uppermost position against the biasing force of a return spring (not shown) disposed in the chamber 46. Thus, the gap G between the main spring unit 12 and helper spring unit 14 is maximized. At this time, the main and helper spring units 12 and 14 are in a non-restricted state, and the spring characteristics are as in the prior art which is shown in FIG. 1. Here, the deflection $\delta_3$ from the start of the contact between the main and helper spring units 12 and 14 until the attainment of maximum contact is comparatively large. This state is suited to, for instance, running on good road with a light load. When the manual control unit 54 is operated to supply compressed oil from the fluid source 58 through the control valve 52, duct 48 and passage 44 into the chamber 46, the piston 28 is lowered. As the piston 28 is lowered, the main spring unit 12 is brought into contact with the helper spring unit 14 via the intermediate member 30. When the piston 28 is lowered to the lowermost position, the main and helper spring units 12 and 14 are brought into complete contact with each other reducing the gap G to zero. In the complete contact state, the elasticity of the main spring unit 12 and that of the helper spring unit 14 act in concert. Thus, as shown in FIG. 4, the spring constant is always $K_2$, and forms a line having a sharp incline so that deflection $\delta_4$ between $P_1$ and $P_2$ is small. It can thus be seen that even if the load is high, the deflection will be small, so that great change in the vehicle height can be prevented.

Figure 5:
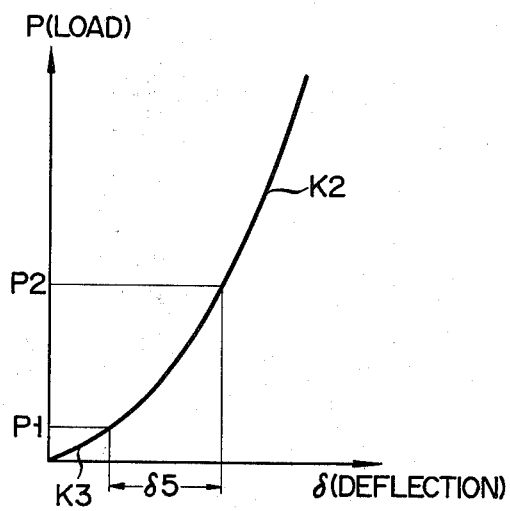

Further, if compressed oil is supplied to the chamber 46 to lower the piston 28 to an intermediate position so as to reduce the gap G between the main and helper spring units 12 and 24, the area of contact of these units can be increased. FIG. 5 shows the spring characteristics at this time. While the main and helper spring units 12 and 14 are restrained in contact with each other, the spring constant of the laminated leaf spring assembly is $K_3$ due to the influence of the elasticity of these units. Thus, when the restrainment of the main and helper spring units 12 and 24 is released with an increase of deflection, the spring constant is changed with changes in the load. When the deflection is increased with an increase of the load, the helper spring unit 14 is brought into complete contact with the main spring unit 12 so that their elasticities act in concert. At this time, the spring constant of the laminated leaf spring assembly 10 is $K_2$. That is, as the load is increased, the spring constant of the laminated leaf spring assembly 10 is changed as $K_3 \rightarrow K \rightarrow K_2$. The deflection $\delta_5$ between the loads $P_1$ and $P_2$ is related to $\delta_3$ and $\delta_4$ as $\delta_4 < \delta_5 < \delta_3$. Thus, the optimum spring constant can be obtained by varying the state of restrainment of the main and helper springs 12 and 14 by varying the gap G according to the road condition and load.

Figure 6:
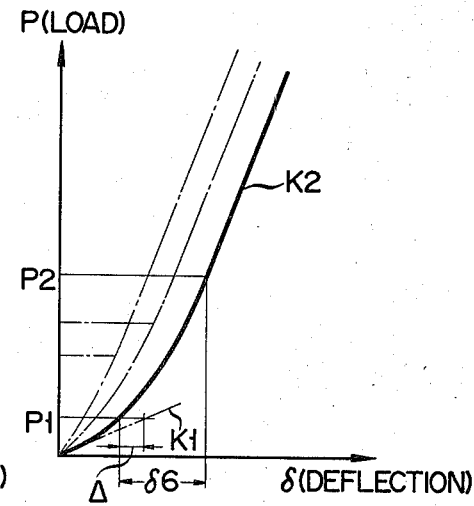

In the above embodiment a pair of clamping means have been disposed at the ends of the helper spring unit 14. However, it is possible to provide a pair of clamping means 24 and 25 on the helper spring unit 14 each between each end thereof and the bolt unit 16 as shown by one-dot chain line in FIG. 2. In this case, a different gap G' can be provided between the main and helper spring units 12 and 14 at each end of the helper spring unit 14. With this construction in order to provide a varied gap G', the instant of commencement of the contact of the helper spring unit 14 with the main spring unit 12 can be advanced by $\Delta$ with respect to the spring characteristic of FIG. 1, as shown in FIG. 6. The deflection $\delta_6$ in the load range between $P_1$ and $P_2$ is set such that $\delta_4 < \delta_6 < \delta_5 < \delta_3$. In this way when restraining the main and helper spring units 12 and 14 by providing the clamping members closer to the center, if the gap G' is varied, the load $P_1$ will vary until the main and helper spring units 12 and 14 are brought into contact with each other. That is, the deflection until the spring constant is changed to $K_2$ can be varied to vary the spring characteristic as shown by one-dot chain line in FIG. 6.

In the above embodiment use has been made of the hydraulic cylinder means 32 as means for varying the gap G between the main and helper springs 12 and 14. However, this is by no means limited, and it is possible to use a cam, a link motion or a screw mechanism in lieu of the hydraulic cylinder means 32. Further, it is possible to utilize compressed air or electromagnetic force in lieu of compressed oil.

As described above, according to the invention there is provided an apparatus for controlling the spring constant of a laminated leaf spring assembly, which comprises clamping means mounted on the laminated leaf spring assembly for clamping the laminated leaf spring assembly in the direction of the thickness thereof, the clamping means including a fixed spring-supporting member on which a helper spring unit is attached such that it is separated a predetermined distance from a main spring unit, and a movable press member positioned to face the helper spring unit and press the main spring unit against the helper spring unit. The apparatus further comprises means for pressing the press member to urge the main spring unit against the helper spring unit. Thus, the spring constant of the laminated leaf spring assembly can be set to an optimum value depending upon the road condition, the load acting on the laminated leaf spring assembly and/or the presence of the user. By appropriately setting the spring constant, it is thus possible to readily obtain a construction, with which the height of a body to be supported, for instance the body of a vehicle, will not be greatly varied even if the load is high. Also, it is possible to obtain a construction, where the deflection is small even when the vehicle is running along a rough road.

What we claim is:

1. In an apparatus for controlling the spring constant of a laminated leaf spring assembly used in a vehicle, wherein said leaf spring assembly includes a main spring unit of a first spring constant and a helper spring unit of a second spring constant both extending in the running direction of the vehicle, the spring units being coupled together at their central portions wherein the ends of the main spring unit are attached respectively to the body of the vehicle and the central portion of the main spring unit is attached to a wheel of the vehicle, and wherein a gap is formed between the helper spring unit and the main spring unit when the leaf spring assembly is unloaded, said gap diminishing when a load is applied to the leaf spring assembly in excess of a predetermined value, the improvement comprising:

clamping means provided at at least two opposite locations on the leaf spring assembly with respect to the central portions of the main spring unit and the helper spring unit for clamping the main spring unit and the helper spring unit to face one another of form a certain gap between the ends of the helper spring unit and the confronting surface of the main spring unit when the leaf spring assembly is unloaded, said clamping means including a spring supporting member attached to the helper spring unit, hydraulic cylinder means having a hydraulic cylinder and including a press member movable in said cylinder, said cylinder facing said spring supporting member and having an opening at a lower end thereof, said press member being movable in said cylinder between a position wherein said press member is separated from the main spring unit, and a position wherein said press member urges the main spring unit downward to engage with the helper spring unit, and coupling means for coupling said supporting member and said cylinder means to one another, said coupling means extending from the spring supporting member toward said cylinder means wherein the width of said coupling means is greater than that of the main spring unit; and hydraulic control means coupled to said cylinder means for driving said clamping means to vary the gap between the spring units, said hydraulic control means including a fluid source for supplying operating fluid to said cylinder, a control valve for controlling the quantity of the operating fluid supplied to said cylinder, and command means for issuing commands to operate said control valve;

wherein said certain gap between the ends of the helper spring unit and the main spring unit can be reduced by a desired amount by operation of said hydraulic control means to obtain a desired load-deflection characteristic for the leaf spring assembly, said characteristic being functionally related to the first and the second spring constants of the main and the helper spring units.

2. The apparatus of claim 1, wherein said clamping means are arranged at four locations on the leaf spring assembly to provide a pair of said clamping means on each side of the helper spring unit with respect to the center portion thereof.

3. The apparatus of claim 1, comprising an elastic intermediate member fixed to said press member for contacting the main spring unit when said hydraulic control means is operated for permitting sliding movement of the main spring unit relative to said press member.

4. The apparatus of claim 1, wherein said coupling means of said clamping means includes an outer flange integrally formed on said cylinder means at the open end of said cylinder, a number of cylindrical spacers, and a number of bolt members for fixing said outer flange of said cylinder means to said spring supporting member through said cylindrical spacers.

5. The apparatus of claim 1, wherein said cylinder means of said clamping means forms an annular space to define a portion of said cylinder, said press member is in the form of a hollow cylinder the circumferential wall of which is arranged to move axially within said annular space, and said press member has a closed end wall for defining a cylinder chamber.

6. The apparatus of claim 5, wherein said cylinder means has a passage extending parallel to the axis of said annular space for communicating said operating fluid from said control valve outside said cylinder means to said cylinder chamber.

7. The apparatus of claim 1, wherein said command means is arranged to be manually operated by a driver of the vehicle.

* * * * *

UNITED STATES PATENT AND TRADEMARK OFFICE
CERTIFICATE OF CORRECTION

PATENT NO. : 4,433,833
DATED : February 28, 1984
INVENTOR(S) : Takayuki TABE, et al It is certified that error appears in the above-identified patent and that said Letters Patent is hereby corrected as shown below:

COLUMN 5 (claim 1), line 34, before "a certain gap"

change "of form" to --to form--.

Signed and Sealed this

Sixteenth Day of April 1985

[SEAL]

Attest:

DONALD J. QUIGG

Attesting Officer     Acting Commissioner of Patents and Trademarks